H. A. HUMPHREY.
APPARATUS FOR UTILIZING HEAT ENERGY.
APPLICATION FILED APR. 7, 1914.

1,228,444.

Patented June 5, 1917.
7 SHEETS—SHEET 1.

WITNESSES
Howard J. Oke
Mae Hofmann

INVENTOR
Herbert Alfred Humphrey
BY
ATTORNEY.

H. A. HUMPHREY.
APPARATUS FOR UTILIZING HEAT ENERGY.
APPLICATION FILED APR. 7, 1914.

1,228,444.

Patented June 5, 1917.
7 SHEETS—SHEET 2.

WITNESSES:

INVENTOR
Herbert Alfred Humphrey
BY
ATTORNEY.

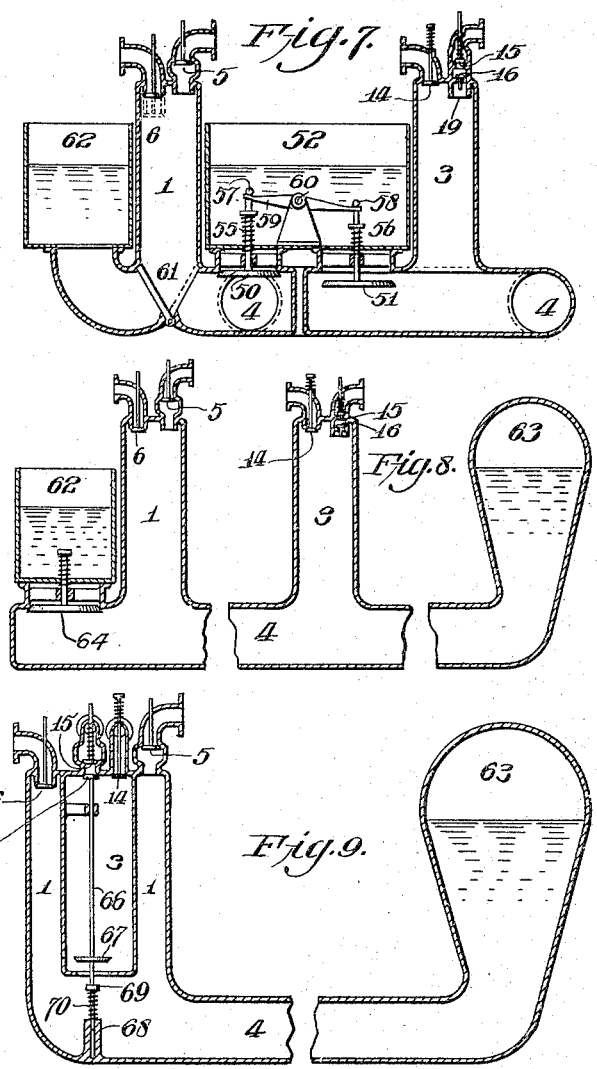

H. A. HUMPHREY.
APPARATUS FOR UTILIZING HEAT ENERGY.
APPLICATION FILED APR. 7, 1914.

1,228,444.

Patented June 5, 1917.
7 SHEETS—SHEET 4.

WITNESSES:

INVENTOR
Herbert Alfred Humphrey
BY
ATTORNEY.

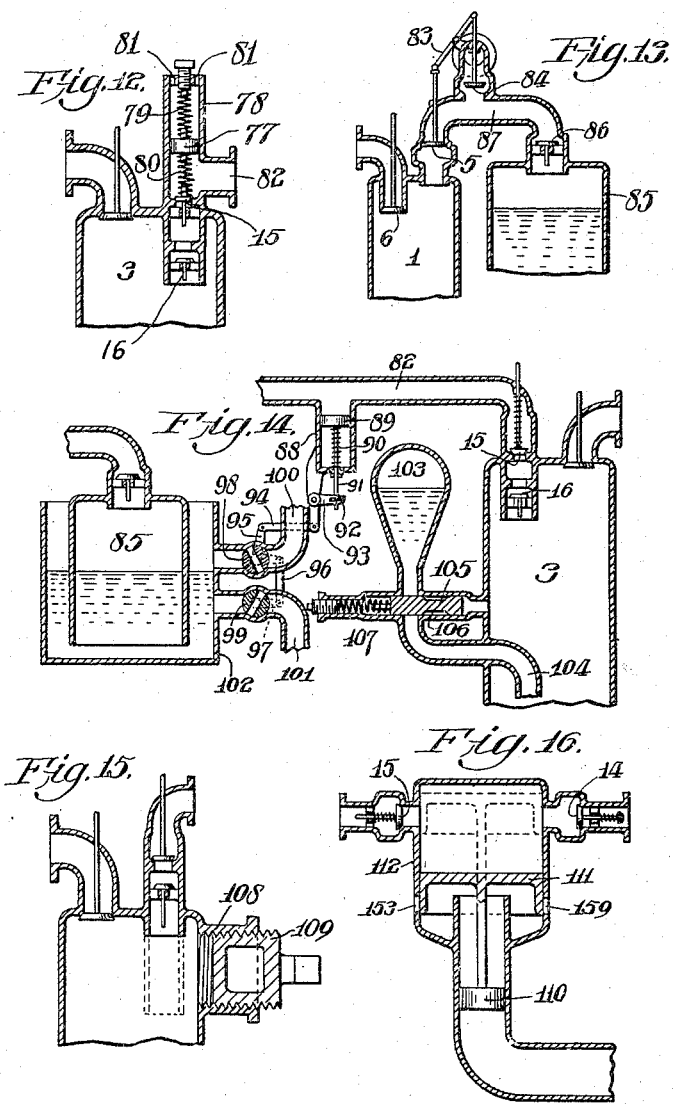

H. A. HUMPHREY.
APPARATUS FOR UTILIZING HEAT ENERGY.
APPLICATION FILED APR. 7, 1914.
1,228,444.
Patented June 5, 1917.
7 SHEETS—SHEET 6.
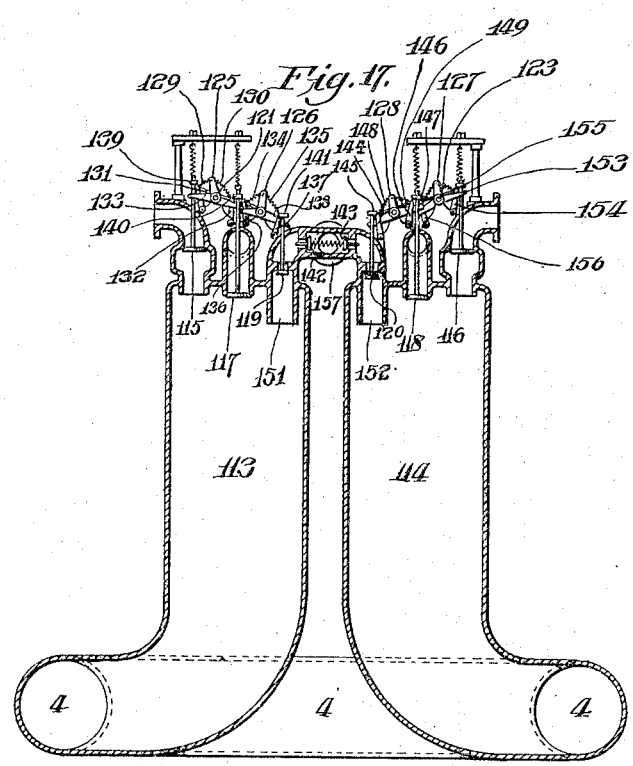

H. A. HUMPHREY.
APPARATUS FOR UTILIZING HEAT ENERGY.
APPLICATION FILED APR. 7, 1914.

1,228,444.

Patented June 5, 1917.
7 SHEETS—SHEET 7.

WITNESSES:

INVENTOR
Herbert Alfred Humphrey
BY
ATTORNEY.

UNITED STATES PATENT OFFICE.

HERBERT ALFRED HUMPHREY, OF LONDON, ENGLAND, ASSIGNOR TO HUMPHREY GAS PUMP COMPANY, A CORPORATION OF NEW YORK.

APPARATUS FOR UTILIZING HEAT ENERGY.

1,228,444.   Specification of Letters Patent.   Patented June 5, 1917.

Original application filed July 17, 1908. Serial No. 444,061. Divided and this application filed April 7, 1914. Serial No. 830,262.

*To all whom it may concern:*

Be it known that I, HERBERT ALFRED HUMPHREY, a subject of the King of Great Britain, residing in London, England, have invented a new and useful Apparatus for Utilizing Heat Energy, of which the following is a specification.

My invention relates to improvements in apparatus for utilizing heat energy in the movement of liquid for compressing air or gases. The object of the invention is to provide improved means or apparatus for effecting the method described in my co-pending application filed July 17, 1908, Serial No. 444,061 of which the present application is a division.

Referring to the drawings, which illustrate merely by way of example such apparatus—

Figs. 5, 6, 7, 8 and 9 are similar views showing further modifications.

Fig. 11 is a diagrammatic plan view.

Fig. 12 is a vertical section of a device for controlling the pressure at the air delivery.

Fig. 13 is a vertical section on a measuring device for combustible charges.

Fig. 15 is a vertical section of a device for varying the effective volume of the combustion chamber or the compressor chamber.

Fig. 16 is a vertical section of the device whereby the elastic fluid compressed is separated from the compressing mass of fluid.

Fig. 17 is a vertical section on a somewhat enlarged scale of another modified form of apparatus wherein the combustion and compressor chambers alternate in their functions.

Similar numerals refer to similar parts throughout the several views.

Figure 1:
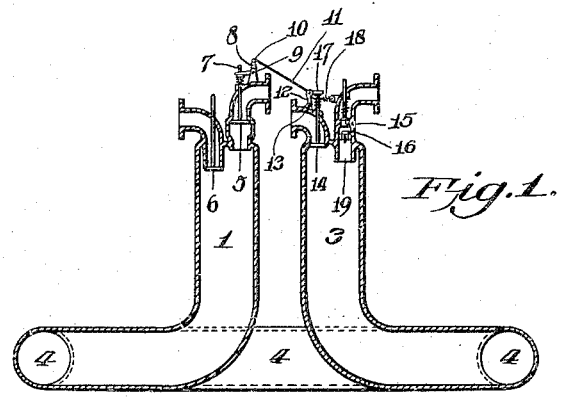
Figure 1 is a diagrammatic vertical section.

A form of the apparatus, which may be regarded as one of the simplest examples inasmuch as it does not require that there shall be either an intake or discharge of fresh liquid at each cycle, is shown in Fig. 1, in which 1 is the pump chamber and 3 is the compressor chamber, connected by a liquid duct 4. In the top of chamber 1 are fitted an admission valve 5 for cumbustible mixture and an exhaust valve 6 for burnt products. In the co-pending application of Humphrey and Rusdell filed June 13, 1908 having Serial No. 438,426, are described several types of valve gear suitable for controlling the valves and applicable to the present purpose. When there is no liquid inlet valve, valve gears which in presence of such a valve are dependent thereon for their operation, may be made to depend in similar manner on a flexible diaphragm or piston fitted to the combustion chamber. It will be sufficient to state that whatever valve gear is used the exhaust valve opens when the ignited combustible mixture has expanded to substantially atmospheric pressure or other desired pressure, and is shut when the rising liquid has exhausted sufficient of the products of combustion. The exhaust valves may conveniently be shut by impact of the rising liquid, and remain shut until the next ignited charge expands to atmospheric pressure. The admission valve opens by suction against the action of a light spring during the period at which it is desired to introduce the charge. In the present example the stem of the admission valve carries a pin 7 capable of engaging with the bell crank 8 pivoted at 9 and carrying a pin 10 for engaging in the slotted end of rod 11 attached to a pawl 12 pivoted at 13 on the compressor.

On the compressor is fitted an inlet valve 14 which opens against a light spring and may be locked in an open position by pawl 12 which when pulled to the right by spring 18 engages above the collar 17 on the stem of valve 14, and so keeps this valve from closing again until this pawl is released by the motion of bell crank 8 which occurs when admission valve 5 opens. There is also fitted on the compressor a non-return outlet valve 15 controlled by a spring. In the outlet pipe there is also a valve 16 suitably supported and adapted to close on a seat just above it; this valve is so loaded, however, that the escaping air cannot close it, although the impact of the rising liquid is capable of doing so. The outlet pipe projects some distance into the compressor chamber so that the liquid rising in the chamber can drive out air until the level of the liquid reaches the level of the projecting part 19 of the pipe, but further rise of the liquid imprisons a cushion of air in the top of the compressor chamber and causes liquid to be forced up the outlet pipe to shut valve 16 after which, all outlets being closed in the top of the compressor chamber, the imprisoned elastic cushion may be further compressed.

The action of the apparatus may now be explained. The valves being in the position shown, it may be assumed that there is a compressed combustible mixture in the top of chamber 1 above the level of the liquid and that there is a charge of air or other elastic fluid in chamber 3 approximately at atmospheric pressure. Explosion occurs at or about maximum compression pressure; as a suitable mode of ignition, that explained in my copending application filed May 11, 1908 having Serial No. 432,171, may be adopted. The increase of pressure thus produced drives the liquid downward and outward from chamber 1 through the pipe 4 which is long enough to permit a considerable portion of the energy to be transformed into kinetic energy of the moving liquid, and causes the liquid to rise in chamber 3, thus compressing the air therein. It may be assumed that on the discharge side of valve 15 there already exists compressed air at a pressure corresponding with that at which it is desired to deliver the air, so that valve 15 will not open until the pressure in chamber 3 exceeds somewhat the pressure at which the air is to be delivered, after which air will be discharged past valve 16 which remains open and past valve 15 which is opened under the action of the compressed air. According to the circumstances of the case, it may be that the level of the liquid in chamber 3 will not rise above the level of the lower projecting portion 19 of the outlet pipe; but if it does, a cushion is formed in the top of chamber 3 above this level and valve 16 is shut by impact of liquid rising in the outlet pipe, in which case the further rise of pressure due to the compression of the elastic cushion will for the time being keep valve 16 shut.

Returning to the consideration of chamber 1, when expansion has reached atmospheric pressure valve 6 opens and, should the movement of the liquid column not have ceased by this time, further movement of the liquid will cause air or products of combustion to be drawn back through the exhaust pipe toward the chamber. On the column of liquid coming to rest the level of liquid in chamber 1 is at its lowest point and in chamber 3 at its highest point, and in the top of chamber 3 there is a quantity of compressed air consisting of that portion of the total charge which has not been expelled through the outlet pipe. This compressed air now forces the column of liquid downward and outward from chamber 3, thus reversing the flow and causing liquid to rise in chamber 1. There being a free opening through the exhaust valve to atmosphere, the liquid rising in chamber 1 expels the burnt products therefrom until, on attaining the level of valve 6 it shuts this valve by impact and compresses an elastic cushion in the top of chamber 1. In the meantime the energy of compression of the air contained in chamber 3 having been expended in imparting velocity to the column of water, the air arrives at atmospheric pressure and the continued downward motion of the liquid in the chamber 3 causes a fresh charge of air to be drawn in through valve 14 which is sucked open against the action of a light spring. When this occurs pawl 12, which previously rested against collar 17, is pulled by spring 18 and engages over the collar so that it locks the inlet valve in its open position. A point in the cycle is now reached where the column of liquid once more comes to rest and there is contained in the top of chamber 1 a compressed elastic cushion in this case consisting of burnt products, or of burnt products and air, and in chamber 3 there is air at atmospheric pressure.

The compressed elastic cushion in the top of chamber 1 now expands, reverses the flow of liquid, and on the level of the liquid falling until atmospheric pressure is reached, which occurs when the level is about that of valve 6, the further motion of the liquid opens the admission valve 5 against the action of its light spring and draws in a fresh combustible charge. Exhaust valve 6 cannot open because it is locked in one or other of the manners described in said copending application Serial No. 438,426. The admission valve 5 in opening operates bell crank 8, rod 11, and pawl 12, and so permits the spring of valve 14 to close the valve, thus stopping the discharge of air which was occurring as the liquid rose in chamber 3.

This arrangement insures that the whole energy of expansion of the elastic cushion shall be utilized in giving velocity to the column of liquid until atmospheric pressure or thereabout is reached in chamber 1, after which admission valve 5 opens and valve 14 closes as described. The liquid continues to move from the pump portion toward the compressor portion until its energy is expended in forcing liquid to rise in chamber 3 and compresses the air therein, and then the liquid, having once more been brought to rest, the compressed air in chamber 3 again reverses the direction of flow, causing liquid to again rise in chamber 1 and compress the fresh combustible charge therein, which, being ignited, commences a fresh cycle.

It should be mentioned that in this case bell crank 8, rod 11, and pawl 12 are fitted for the better regulation of the working, but are not essential thereto, as the cushion expansion energy may suffice to draw in the necessary charge although compressing air in chamber 3 throughout the cushion expansion and charging stroke in chamber 1.

The amount of the charge admitted to chamber 1 is preferably measured by a measuring device such as that described in my co-pending application filed June 13, 1908, having Serial No. 438,425, with reference to Fig. 12, where the amount of charge drawn in is determined by the rise and fall of liquid in the measuring device.

The charge is measured not only to insure the regular working of the apparatus, but to enable the supply of combustible mixture to be cut off at the desired point so that the charge drawn in can be expanded below atmospheric pressure. In this case a partial vacuum is created in chamber 1 which assists the pressure in chamber 3 in imparting the necessary kinetic energy to the liquid to give the compression stroke in chamber 1.

In order to work the apparatus just described most advantageously the pressure at which the air or gas is delivered should not exceed a certain limit, depending upon the mean effective area of the indicator diagram taken from the power cylinder, and consequently, when other ranges of pressure are required, the apparatus is modified as will be described.

Figure 2:
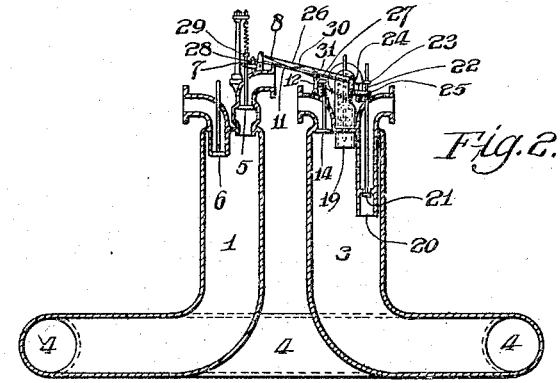
Fig. 2 is a similar view of a modified form of apparatus.

In order that the operation of the compressor may be variable in the sense that it may deliver at each cycle either a large quantity of air at relatively low pressure or a small quantity of air at relatively high pressure, the modification shown in Fig. 2 may be adopted. Here, in addition to the parts already described and similarly numbered, chamber 3 has another pipe 20 communicating with the atmosphere and projecting for a considerable distance into the chamber. This pipe contains a valve 21 on the stem of which is a pin 22 and a collar 23 adapted to engage respectively with one arm of bell crank 24 and with pawl 25. The other arm of bell crank 24 is connected by rod 26 with bell crank 8, and pawl 25 is connected by rod 27 with another pawl 28, the latter being capable of engaging under collar 29, but the length of rod 27 is such that the two pawls cannot both be in engagement under their respective collars.

Two springs 30 and 31 have their ends attached to rods 26 and 27 respectively in such a manner that when rod 26 moves either to the right or the left rod 27 is pulled by the springs to follow it. There is also attached to bell crank 8 a spring which is not shown but acts so as to render stable the extreme positions of rod 26 in a manner described in said co-pending application No. 438,426. Valve 21 is intended in this case to open under its own weight, its motion being limited by a spring or stop, and to be closed by the liquid rising in pipe 20 and impinging upon the valve. When admission valve 5 opens, pin 7 engaging with bell crank 8 moves rod 26 to the left where it remains until valve 21 opens and pin 22 engages bell crank 24 to move rod 26 to the right.

The action of the modified apparatus shown in Fig. 2 may now be described. The position of the valves as shown is correct for that part of the cycle where expansion of the ignited mixture has occurred in chamber 1 until the liquid driven downward in chamber 1 and rising in chamber 3 has closed valve 21 which is locked shut by pawl 25. During the further expansion in chamber 1 the charge of air in chamber 3 is compressed and a portion of it is discharged under pressure into the air delivery pipe, but as before there remains a portion to form an elastic cushion. When the liquid comes to rest the energy of expansion of the cushion in chamber 3 causes the liquid to reverse its flow driving out products of combustion through exhaust valve 6, and when this valve is shut by impact giving the cushion stroke. When the level of liquid falling in chamber 3 is such that the pressure in chamber 3 arrives at about atmospheric pressure valve 14 opens, admitting fresh air, and is locked open by pawl 12 under the action of spring 18; but valve 21 remains closed having been locked by pawl 25. Maximum cushion pressure having been attained in chamber 1 and the liquid again brought to rest, liquid is forced downward in chamber 1 and after reaching the pressure at which the admission valve opens a fresh charge is drawn in, pawl 28 being disengaged from under collar 29 so that the admission valve can open. The liquid rising in chamber 3 during the last mentioned portion of the cycle has no work of compression to do during the first part of its movement because valve 14 is open to the atmosphere but when admission valve 5 opens and so operates bell crank 8 and rod 11, pawl 12 is pulled to the left and valve 14 shuts under the action of its spring, after which the motion of the liquid is arrested by compressing air in chamber 3 and it may be expanding the charge in chamber 1, which is preferably a measured charge, below atmosphere. The charge having been drawn into chamber 1, and bell cranks 8 and 24, and rods 26 and 11 moved to the left, valve 5 shuts, pawl 28 engages under its collar, and pawl 25 is released from under the collar of valve 21 but as there is at this time pressure in chamber 3 valves 21 and 14 remain shut. There is now a compressed cushion of air in chamber 3 and a combustible charge in chamber 1, the pressure of which may be below atmosphere, and these conditions bring about a reversal of flow of the liquid which once more falls in chamber 3 and rises in chamber 1 compressing the charge in the latter. When atmospheric pressure or thereabout is reached in chamber 3 during this part of the cycle, valve 21 will open and, by its pin engaging with bell crank 24, will reverse the position of bell cranks 24 and 8 and rod 26 so that they are brought back to the position shown. The compressed charge in chamber 1 is now ignited, and liquid flows from the pump portion toward the compressor portion expelling air from chamber 3 through valve 21 until the liquid arrives at the level of the bottom of the pipe 20, whereupon continued rise of the liquid shuts valve 21 and the cycle is once more brought back to the point from which the operations described are repeated.

From the foregoing description it will be evident that however much air may be drawn into chamber 3 the quantity which is compressed by the working stroke occurring in chamber 1 cannot exceed the capacity of the chamber above the level of the bottom of pipe 20. Consequently by suitably adjusting this level the amount of air which undergoes compression may be varied, and the variable operation of the compressor may be thus achieved.

Figure 3:
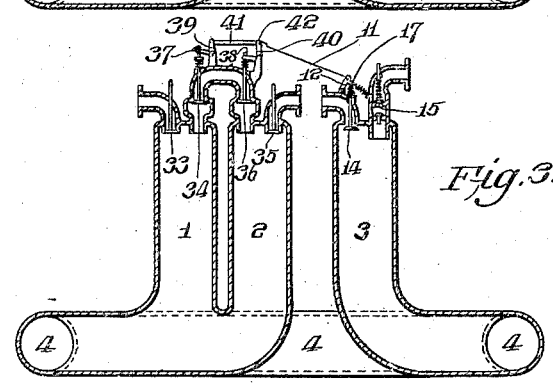
Fig. 3 is a similar view of another modified form.

So far only the type of pump described in said co-pending application No. 438,426, has been dealt with as being one of the simplest to describe, but other types of pumps as for instance that described in Patent No. 1,085,865 dated Feb. 3, 1914, are equally applicable in combination with the compressor portion to form a complete compressing apparatus. Such a combination is illustrated in Fig. 3 where 1 and 2 are the combustion chambers of the pump and 3 is the air vessel, the construction of the latter being the same as in Fig. 1. It is unnecessary to set forth in detail the cycle of operations occurring in the pump or to describe the functions of the valve gear as they are fully dealt with in the said specification but the action of the combined apparatus may in general terms be described.

Fitted to the top of chamber 1 is an exhaust valve 33 for burnt products, which opens under the action of its own weight and closes by impact of liquid upon it, an admission valve 34 which is opened by suction against the action of a light spring which closes the valve again when the pressures on the two sides of the valve are sufficiently equalized. An exhaust valve 35 and an admission valve 36 are corresponding parts fitted to chamber 2. Pins 37 and 38 on the stems of valves 34 and 36 are adapted to engage with one end of bell cranks 39 and 40 respectively and the other ends of these bell cranks are connected together by link 41. A pin 42 is attached to one end of link 41 and engages in the slotted end of rod 11 which is attached to pawl 12 and serves a purpose similar to that of the rod bearing the same number in Fig. 1. The position of the valves shown in Fig. 3 is correct when ignition is about to occur in either of the chambers. Assuming that ignition occurs in chamber 1, there will be a cushion of burnt products in the top of chamber 2 (or a cushion containing a portion of the combustible charge if a modification of this type of pump is being used) otherwise the chamber is full of liquid. In chamber 3 there will be a charge of air which is at atmospheric pressure. The pressure due to combustion in chamber 1 drives the liquid downward and outward from that chamber and through pipe 4 into chamber 3, driving out air past valve 14 which is at present locked open. When expansion has been carried to or about atmospheric pressure in chamber 1, exhaust valve 33 opens and in chamber 2 liquid falls, causing admission valve 36 to open and drawing in a fresh combustible charge into this chamber. This charge may be determined in quantity by measuring or throttling, and after it is drawn in the admission valve shuts under the action of its spring. Up to this stage the energy of expansion had been mostly utilized in imparting kinetic energy to the liquid, but when admission valve 36 opened its movement caused pin 38 to operate bell crank 40 rod 11 and pawl 12 thus withdrawing this pawl and permitting valve 14 to shut.

The kinetic energy then stored in the moving liquid is used to compress the charge of air at this time inclosed in chamber 3 and to deliver a portion of such charge under pressure past valve 15. There remains, however, sufficient air in the chamber to form the necessary elastic cushion to store the energy required to give the compression stroke. This stored energy is utilized to produce a reverse flow of the liquid so that liquid now begins to fall in chamber 3 and to flow back toward the pump portion of the apparatus rising in chamber 1 to expel burnt products through exhaust valve 33 and then into chamber 2 to compress the fresh combustible charge ready for the commencement of a fresh cycle by the ignition of this charge. After atmospheric pressure has been reached in chamber 3 the further movement of the liquid, due to its kinetic energy, draws a charge of air into this chamber through valve 14 which is sucked open to admit this charge and locked in its open position by pawl 12 engaging above collar 17. Thus everything is in readiness for commencing the next cycle by the ignition of the compressed combustible charge in chamber 2. The arrangement described insures that the burnt gases in either chambers 1 or 2 according to which is giving the working stroke, shall be expanded to atmosphere.

If bell cranks 39 and 40, rod 11 and pawl 12 are removed the apparatus will still work but care must be exercised in designing the proportion of the parts to insure that the burnt gases are allowed to expand to atmosphere. The main difference in this case is that valve 14 is shut at the beginning of the working stroke and that air is compressed from the time that liquid begins to rise in chamber 3 instead of from the time when the burnt gases have expanded to atmospheric pressure. In either case the most advantageous working occurs when the pressure at which the air or gas is delivered does not exceed a certain limit depending on the mean effective pressure of the ignited expanding gases. Consequently, as was explained with reference to Fig. 1, a modified arrangement is advisable when other ranges of pressures for the compressed air are desired.

Figure 4:
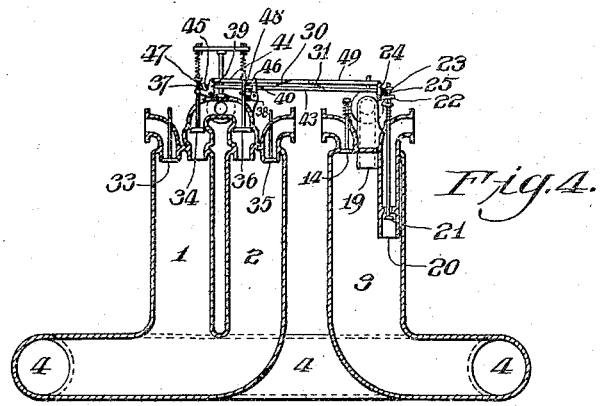
Fig. 4 is a similar view of another modified form.

Fig. 4 shows such a modified arrangement in which the additional pipe 20 and valve for air 21 are shown fitted into the top of chamber 3 as in the case of Fig. 2. There are also counterparts of the gear shown in Fig. 3, thus, bell crank 39 has one of its arms adapted to engage with pin 37 on the stem of valve 34, and the other arm of this bell crank is connected by link 41 with bell crank 40. Pawl 25 is fitted to engage under collar 23 and is also connected by rod 43 with pawls 45 and 46 adapted to engage under the collars 47 and 48 of admission valves 34 and 36 respectively. Springs 30 and 31 are connected as shown between the two rods 49 and 43 so that the movement of rod 43 tends to follow the movement of rod 49. It will be seen that while link 44 is of such a length that pawls 45 and 46 can both be in engagement under their respective collars, pawl 25 cannot at the same time be in engagement under collar 23.

The operation of this arrangement is as follows:—Assuming that there is a compressed combustible charge in chamber 1, that liquid fills chamber 2 with the exception of an elastic cushion in the top thereof, and that the valves are in the position shown. Liquid is at a relatively low level in chamber 3 and the chamber contains a charge of air. The charge in chamber 1 is now ignited and liquid is driven downward and outward from this chamber through pipe 4 into chamber 3. Air is discharged past valve 21 into the atmosphere until the level of the liquid reaches the bottom of pipe 20 when liquid rising in this pipe shuts valve 21 by impact and the valve is immediately locked by pawl 25 which is brought beneath collar 23 by the tension on spring 30.

Further motion of the liquid compresses the air now inclosed in the chamber. A portion of the compressed air is discharged under pressure but there remains sufficient to form the necessary elastic cushion to store the energy for compressing the combustible charge.

As before described, when the ignited gases in chamber 1 have expanded to atmospheric pressure exhaust valve 33 opens, and liquid falls in chamber 2 opening valve 36 so soon as the pawl 46 is released from under collar 48 by the movement of pawl 25 and link 43 to the right; a fresh combustible charge, preferably measured, is thus drawn in. The opening of admission valve 36 operates through pin 38 bell crank 40 and moves rod 49 to the left, thus putting tension on spring 31 so that when admission valve 36 shuts again rod 43 is urged to the left and pawl 46 engages under collar 48 and withdraws pawl 25 from under collar 23.

The liquid having come to rest a reverse flow occurs, the elastic cushion in chamber 3 expands, and liquid flows toward chambers 1 and 2 giving the usual exhaust and compression strokes. The pressure in chamber 3 continues to fall and at approximately atmospheric pressure valve 21 opens under its own weight admitting fresh air as the movement of the liquid continues. Valve 14 controlled by a light spring, may also open under suction and facilitate the intake of fresh air. When valve 21 falls link 49 is moved to the right and tension is put on spring 30 to urge rod 43 to the right. Thus at the end of this stage of the cycle there is a compressed combustible charge in chamber 2 and in chamber 3 a charge of air, and the cycle is ready to be repeated by ignition of the charge in chamber 2.

As was explained with reference to Fig. 2, by varying the length of the portion of pipe 20 that extends into chamber 3 the amount of air compressed at each cycle may be varied and consequently the energy developed at each cycle may be utilized in compressing a large quantity of air to a relatively low pressure, or in compressing a small quantity of air to a relatively high pressure.

The action of the apparatus so far described may be varied to some extent by varying the amount of liquid contained therein; thus, reduction of the quantity of liquid is equivalent to increasing the capacity of the chambers, and increase of the quantity of liquid is equivalent to decreasing the capacity of the chambers. Devices will presently be described for varying the amount of liquid to suit external conditions such as the demand for compressed air, and to compensate for liquid lost by leakage or evaporation. It will also be described presently how the liquid which reciprocates in the apparatus may be efficiently cooled.

Modifications of the apparatus will now be described in which at each cycle fresh liquid is admitted and rejected, and firstly in connection with Fig. 5. The pump chamber and the compressor chamber are shown in such relative position that valves 50 and 51 for liquid, one near the pump and the other near the compressor, may be conveniently placed close together with the object that their movements may be made to control one another. A tank 52 is so placed that there may be free flow of liquid to the short pipes in which these valves are situated, which pipes are continued as at 53 and 54 to communicate with the respective chambers. As before, pipe 4 connects the pump and compressor portions of the apparatus.

Assuming that the type of pump is that described in said co-pending application Serial No. 438,426, and that chamber 1 is the combustion chamber of this pump, the exhaust valve will be that shown in dotted lines, the admission valve being shown in full lines. With all the valves in the position shown and a compressed combustible charge in the top of chamber 1 and a charge of air in chamber 3, ignition occurs in chamber 1 and liquid is forced downward and outward from chamber 1 toward chamber 3. Valve 51 is normally open so that liquid can escape past it into tank 52, while kinetic energy is being imparted to the moving column of liquid. When, however the ignited gases in chamber 1 have expanded to a suitable extent the pressure below valve 50 is equal to that above this valve, and the further expansion of these gases causes valve 50 to open against the action of spring 55 thus admitting liquid to flow into the apparatus from tank 52. Valve 50 has on its stem a pin 57 adapted to engage against one arm of rocking lever 59 which is pivoted at 60 and the other arm of which engages against pin 58 on the stem of valve 51, so that the downward movement of valve 50 causes valve 51 to shut. Thus the energy of expansion of the ignited gases has been so far mainly transformed into kinetic energy of the moving column of liquid and when valve 51 shuts this kinetic energy is utilized in compressing the charge of air contained in chamber 3, some of which air is delivered under pressure past valve 15 but sufficient is retained to form an elastic cushion in which energy is stored for reversing the flow of the liquid. On reaching atmospheric pressure exhaust valve 6 is opened under the action of its own weight and when the reverse flow occurs valve 50 is closed by the action of its spring and remains closed, owing to the pressure below the valve exceeding that above it. Liquid falls in chamber 3 and rises in chamber 1 expelling the exhaust products past exhaust valve 6 and on reaching this valve the liquid shuts it by impact and compresses the elastic cushion contained in the top of the chamber. About the time when the pressure in chamber 3 reaches that of the atmosphere valve 51 opens, also valve 14 is sucked open by the falling liquid and a fresh charge of air is drawn into chamber 3. Thus the level of liquid in chamber 3 tends to be maintained at the level of liquid in tank 52 and valve 14 shuts under the pressure of its own spring when the pressures are adjusted and any further movement of liquid in pipe 4 draws in fresh liquid through valve 51.

The compressed elastic cushion in the top of chamber 1 now expands. Liquid is driven downward in chamber 1 along pipe 4 and escapes past valve 51 into tank 52 until, on the pressure falling sufficiently in chamber 1 fresh combustible mixture is drawn through valve 5 until the level of liquid in chamber 1 approaches that of the liquid in tank 52. The continued movement of the column of liquid in pipe 4 causes valve 50 to open, thus shutting valve 51. Fresh liquid is drawn in past valve 50 and the column of liquid proceeds to compress the air in chamber 3 until the work done brings it to rest, when valve 50 shuts. Valve 5 shuts under the action of its spring after the combustible charge has been drawn in, and valve 51 remains closed under the pressure now exerted upon it. The energy stored in the elastic cushion in chamber 3 is utilized to reverse the direction of flow, so that liquid falls in chamber 3, rises in chamber 1 and compresses the combustible charge therein, and toward the ends of this flow of liquid valve 51 opens again, thus bringing all the parts once more into position for repeating the cycle.

From the foregoing description it will be seen that the working of the apparatus last described is suitable for compressing air to high pressures inasmuch as the energy of expansion of the ignited combustible gases is at first transformed into kinetic energy of the moving liquid and this energy may be made to operate upon a relatively small quantity of air and thus compress this air to a high pressure. For compressing air to comparatively low pressures, the pressure of spring 55 on valve 50 is released so that this valve is normally opened under its own weight and the pressure of spring 56 is increased so that this valve is normally held shut. The effect of this change is that when the working stroke occurs in chamber 1 valve 50 opens earlier but as valve 51 remains closed the liquid which is forced downward and outward from chamber 1 finds no outlet past valve 51 and the compression of air starts from the commencement of the said working stroke, and a larger quantity of liquid rises in chamber 3 than in the case last considered. The energy of expansion of the ignited gases is therefore made to compress a larger volume of air, and that portion of the air which is delivered from the apparatus is delivered at a less pressure. As before, a portion of the air is retained in chamber 3 to supply the energy to reverse the flow of liquid.

After reversal and the expansion of the air cushion in chamber 3 air is drawn into this chamber until the level of the liquid approximates to that of the liquid in tank 52, liquid meanwhile escaping past valve 50 after rising in chamber 1. The level of liquid in chamber 1 will at this time be approximately the level of the liquid in tank 52, some of the products being already exhausted. The continued movement of the column of liquid in pipe 4 now causes valve 51 to open, thus closing valve 50, so that the liquid is forced to rise in chamber 1 to complete the exhaust and give the usual cushion stroke. The liquid, having come to rest, its flow is reversed under the action of the energy of the cushion in chamber 1, and the cushion expansion stroke, followed by the intake of a fresh combustible charge in this chamber, follows, during which air in chamber 3 is compressed. Before the movement of the liquid ceases valve 50 will open, while valve 51 remains shut. The liquid comes to rest, its flow is again reversed due to the pressure in chamber 3, and liquid flows downward in this chamber while the compressed air is expanding. The liquid which would otherwise rise in chamber 1 is at this time escaping through valve 50 into the tank, while the energy of expansion of the air in chamber 3 is being transformed into kinetic energy of the moving liquid. When, however, the point in this expansion is reached at which valve 51 opens, thus shutting valve 50, the kinetic energy of the liquid is utilized in compressing the combustible charge in chamber 1. When this kinetic energy is expended the liquid comes to rest and everything is ready for the starting of a fresh cycle by the ignition of the charge in chamber 1.

It will be seen that more liquid has entered and left chamber 3 than has entered and left chamber 1, and that the volume of air operated upon in chamber 3 is greater than in the previous case, so that the pressure at which the compressed air is delivered will be correspondingly less.

Figure 5:
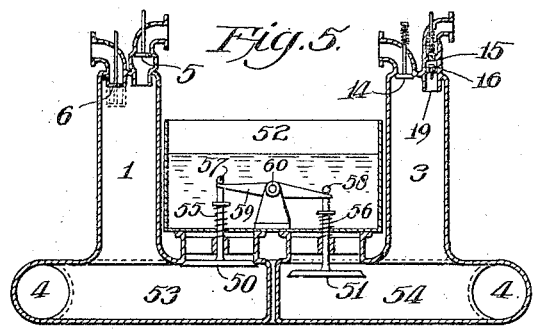

Still referring to Fig. 5, it may now be assumed that the pump is of the type in which the products of combustion are expelled and a new combustible charge drawn in by means of an oscillation of liquid which occurs between the liquid supply and the combustion chamber in a manner fully described in co-pending application filed June 13, 1908, having Serial No. 438,425. In this case the reciprocating liquid only makes two strokes per cycle instead of four strokes per cycle, as in the cases so far considered with reference to Fig. 5, because when expansion has occurred in chamber 1 down to that point at which valve 50 opens, liquid flows past this valve both to follow the liquid moving in the discharge pipe and also to rise in chamber 1 to expel the burnt products and shut the exhaust valve and, on the downward motion which completes its oscillation, to draw in a fresh combustible charge. This operation requires that the level of liquid in the supply tank shall be suitably adjusted and its height must be sufficient to produce the necessary oscillation. This oscillation may be assisted by so raising the level of the liquid in the supply tank that when the oscillation occurs, the liquid rises in chamber 1 past the exhaust valve level and gives a cushion stroke followed by a cushion expansion and combustible charging stroke, in the manner fully explained in the specification last mentioned.

As Fig. 5 is diagrammatic it is not considered necessary to show these simple modifications, but it will be understood that if the level of liquid in the tank is raised, the level of the top of chamber 3 must also be raised. The adjustment of valves 50 or 51 to give high or low pressures will be the same as before, but when the working stroke occurs in chamber 1 that portion of the air which is not discharged from chamber 3 will serve to store up the energy for giving the return flow and compressing the fresh charge in chamber 1.

Figure 6:
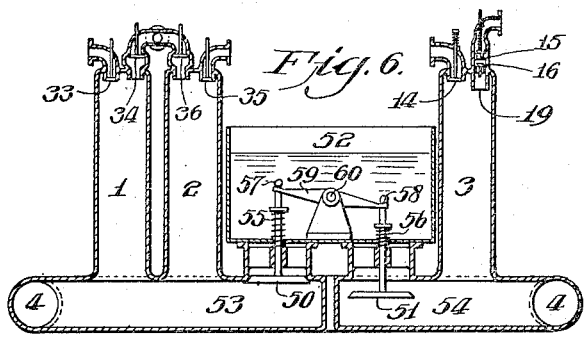

Fig. 6 shows an arrangement similar to Fig. 5 but adapted to the case where the type of pump employed is that described in said Patent No. 1,085,865, in which there are two combustion chambers and in which the return flow of liquid expels the burnt products from one chamber and compresses a fresh combustible charge in the other chamber. 1 and 2 are the combustion chambers and 3 is the air compressor chamber, and so far as the air compressor side is concerned, the cycle is the same as that last considered. Valves 50 and 51 are also adjusted for high or low pressures and operate in the manner already described; the chief difference from the operation described with reference to Fig. 5 lies in the fact that combustion takes place alternately in chambers 1 and 2. Several forms of valve gear for the working of the admission and exhaust valves on chambers 1 and 2 have been described in said Patent No. 1,085,865, and therefore no such gear is shown on the diagram.

The application of one form of apparatus mentioned in said co-pending application filed June 13, 1908, having Serial No. 438,425, to the present invention has already been described, and Fig. 7 of the accompanying drawings is added to show the application of another form of the apparatus mentioned in the said specification. The pump in this case is fitted with an automatic change over valve which alternately closes communication between the combustion chamber and the supply pipe and between the chamber and the discharge pipe, in such a manner that there is communication between the combustion chamber and the discharge pipe during compression of the combustible charge and during combustion and expansion. Communication is established between the chamber and the liquid supply during the oscillation of liquid which exhausts the products of combustion and takes in a fresh combustible charge.

It has been described in the said specification how this pump may be worked in such a manner that the quantity of liquid taken in from the supply may equal the quantity of liquid discharged back into the supply and in this form also it is applicable to the present invention.

The pump in Fig. 7 may work with or without a cushion stroke preceding the intake of a fresh combustible charge, and to indicate this are shown two positions of the exhaust valve, one in dotted lines and one in full lines. When valve 61 is in the full-line position combustion and expansion occur in chamber 1, valve 50 is closed and valve 51 may be either open or closed according to whether the pressure at which the compressed air has to be delivered is to be relatively high or low. When expansion in chamber 1 has proceeded until the pressure on the supply side of valve 61 exceeds the pressure in the chamber, this valve is moved into the position shown in dotted lines, and the liquid then moving with considerable velocity in the discharge pipe draws in liquid through valve 50 to follow it. In the meantime the liquid oscillates between the liquid supply tank 62 and chamber 1 expelling burnt products from the chamber and drawing in a fresh combustible charge.

Assuming that valve 51 was open when ignition occurred in chamber 1, this valve is shut by the opening of valve 50; thus the escape of liquid through valve 51 into tank 52 is cut off and the kinetic energy of the moving column of liquid is utilized in compressing air in chamber 3, some of such compressed air being delivered from the apparatus and some being retained to form the necessary elastic cushion to produce the reverse flow of liquid. When this reverse flow occurs, valves 50 and 51 are both shut and the energy of expansion of the elastic cushion in chamber 3 is utilized to compress the combustible charge in chamber 1 and to draw a fresh charge of air into chamber 3.

When relatively low pressures are wanted, instead of valve 50 being normally closed and valve 51 open, valve 50 is normally open and valve 51 is normally closed, and the effect of this arrangement has already been described.

For the sake of simplicity a tank has been shown extending across the inlets of valves 50 and 51, but it is found advantageous to place a partition in the tank such that the liquid must flow a considerable distance in passing between that portion of the tank which communicates with valve 50 and that portion which communicates with valve 51. Thus a large effective cooling surface can be obtained. The arrangement is practically equivalent to two tanks connected together at their ends.

So far only one pump and one air vessel, fitted with valves, have been described in combination to produce the complete air compressor, but it is evident that either or both parts of the apparatus may be multiplied to produce a single combination. Also, when the energy of combustion is delivered to more than one air vessel only one air vessel need be used for actually delivering air from the apparatus. Take, for instance, the combination of one pump, one air vessel fitted with valves, and one plain air vessel such as is shown in Fig. 8. Then the energy of combustion in chamber 1 may be utilized to compress and discharge air from chamber 3 and to store energy for producing the return flow in air vessel 63. Again in such a combination of parts the air vessel 63 may be utilized to absorb the greater part of the energy of combustion developed in chamber 1 and thus store energy which produces the return flow to compress air in and deliver air from chamber 3 and to compress a fresh combustible charge in chamber 1. In the latter case the liquid duct connecting chambers 1 and 3 would be comparatively short and the liquid duct connecting air vessel 63 would be relatively long.

The operation in the last mentioned case may be explained with reference to Fig. 8. Assuming, for the sake of example, that the pump is of the type described in said copending application having Serial No. 438,425, in which liquid oscillates between the supply tank and the combustion chamber to expel the burnt gases and to take in a fresh combustible charge. At the beginning of a cycle all the valves are in the position shown, and in the top of chamber 1 there is a compressed combustible charge, and in the top of chamber 3 a small compressed elastic cushion, both chambers being in great part filled with liquid, while in air vessel 63 there is a charge of air with the liquid at a low level. Ignition occurs in chamber 1 and liquid is driven downward and outward from the chamber toward air vessel 63 compressing the air in this vessel and incidentally further compressing the elastic cushion in chamber 3, which later on expands again. Air vessel 63 must be large enough to provide sufficient elastic cushion to permit the following action:—When expansion in chamber 1 has reached a point at which valve 64 opens, liquid from the supply 62 enters this chamber and gives the exhaust and charging stroke therein while in chamber 3 the level of the liquid falls consequent upon the pressure being reduced, and a charge of air is drawn into this chamber. The spring on valve 64 is adjusted so that the valve remains open during the first part of the return flow due to expansion of the compressed air in vessel 63, but as the velocity of the liquid increases valve 64 shuts under its action, the adjustment being such that the quantity of liquid which enters and leaves through this valve at each cycle is the same. The inflowing liquid is now forced to rise in chambers 1 and 3 compressing the fresh combustible charge in 1 and air in 3. When the pressure in chamber 3 is sufficient, valve 15 is opened and air is discharged until the kinetic energy of the liquid is expended and the liquid comes to rest. Valve 15 then shuts, and everything is ready for ignition in chamber 1 and repetition of the cycle.

It should be mentioned that when ignition occurs in chamber 1 the level of the liquid in chamber 3 may either be above or below the level of the air discharge pipe in chamber 3. If it is above, valve 16 has already been shut by the rising liquid, and consequently the increased pressure in chamber 1 merely compresses the cushion in the top of chamber 3 as stated, but if the level was below, there will be a further discharge of air from chamber 3 until the liquid rising shuts valve 16 in the manner already described with reference to other cases.

The arrangement mentioned in the last paragraph may be modified by fitting a valve for liquid close to air vessel 63 in the pipe which connects this air vessel with the chambers, in which case it is unnecessary that the liquid which enters and leaves at valve 64 at each cycle should be the same in amount, and the operations may more nearly resemble that described in connection with Fig. 7, where there are two valves for liquid.

The possible combinations of different types of pumps, one or more air compressor chambers and one or more air vessels, with and without liquid inlet valve, are too many for even an enumeration of them, and the manner in which they operate is materially altered by altering their relative positions and the lengths of the ducts which join them, but as the principles involved are common to all of them the examples given will serve to illustrate the invention. It may, however, be advisable to mention the case in which there is a rapid movement of liquid between the combustion chamber and the air vessel, and Fig. 9 illustrates this modification.

There may be merely a short length of pipe connecting separate pump and air compressor portions, this pipe being continued to a considerable length to join an air vessel, or the pump and the air compressor portions may be combined as shown in Fig. 9. In this case the compressor chamber 3 is contained within the combustion chamber 1 and is fitted with the usual inlet valve 14 and outlet valve 15 but in addition to the latter there is a second air outlet valve 65 rigidly connected through rod 66 to valve 67, the rod being continued into a guide 68 and carrying a fixed collar 69. Between this collar and the guide is a spring 70 tending to urge the two valves upward, and the length of the rod between valves 65 and 67 is such that these valves cannot both be closed at the same time. As in the previous case pipe 4 connects with an air vessel 63 which serves to store the energy for reversing the flow of liquid, but a rising main with an open top would also serve a similar purpose.

Assuming the cycle to start with a compressed combustible charge in the top of chamber 1, and a charge of air compressed to the same compression pressure in chamber 3, and that a charge of air exists in chamber 63, all the valves being in the position shown, ignition occurs, and under the increased pressure there is a rapid movement of liquid past valve 67 between chambers 1 and 3 tending to equalize the pressures therein, but owing to the kinetic energy imparted to the liquid moving between these chambers, and there being no outlet open at the top of chamber 3, the pressure in chamber 3 rises above the pressure in chamber 1, so that a reverse flow starts again. Owing to the excess of pressure in chamber 3, the rapid movement of the liquid, and the fact that valve 67 is of greater area than valve 65, valve 67 is closed on its seat against the action of spring 70 and this movement opens valve 65 and so permits a portion of the air compressed in the top of chamber 3 to escape past valve 15. The pressure in chamber 3 being thus relieved, spring 70 again lifts rod 66 thus opening valve 67 and closing valve 65.

There are now in chamber 1 partly expanded products of combustion and in chamber 3 a portion of the compressed air charge, and these two continue to exert pressure on the liquid driving it outward along pipe 4 so that liquid rises in air vessel 63 and compresses air therein, thus storing the energy for the reverse flow. The liquid continues to move, owing to its kinetic energy, after the products of combustion, and the air in chamber 3, have expanded to atmosphere, and its further downward movement causes valve 14 to open and a charge of air to be drawn in, after which valve 14 closes again. The liquid, having come to rest, returns under the influence of the compressed air in air vessel 63 and expels products of combustion from chamber 1 through exhaust valve 6 until, the level of this valve having been reached, the liquid shuts it by impact, a small cushion of exhaust products being imprisoned to prevent shock. Liquid now rises in chamber 3, compressing the air contained therein, until the liquid is brought to rest. The pressure in chamber 3 is now greater than the pressure in air vessel 63 and a movement of liquid toward the air vessel again takes place. When the air in chamber 3 has expanded nearly to atmosphere the liquid in chamber 1, being higher than in chamber 3, falls and draws in a fresh combustible charge. Again the liquid comes to rest, and the energy of the compressed air in the air vessel produces a flow of liquid toward chambers 1 and 3, compressing the fresh combustible charge in chamber 1 and the charge of air in chamber 3 in readiness for the starting of a fresh cycle by the ignition of the charge in chamber 1.

The apparatus last described will work without valves 65 and 67, the usual valve fittings only being provided, like those shown in Fig. 8. In fact, the object of valves 65 and 67 is to prevent liquid being ejected with the air when the surface of the liquid in chamber 3 is disturbed by the sudden flow from chamber 1 to chamber 3 at the moment of ignition. When working without these valves, air is allowed to escape from chamber 3 at the first part of the cycle, until either the pressure in chamber 3 no longer exceeds that at which the air is delivered, or until the usual valve 16, described in connection with other figures and now substituted for valve 65, is shut by impact of liquid. The partly expanded products of combustion in chamber 1 and the compressed air which has not escaped from chamber 3 then act together in driving the liquid outward toward air vessel 63 and the rest of the cycle is the same as that last described.

In this, as in other cases, any other type of pump described in the aforesaid specifications may be used, but it is unnecessary to describe the modifications of the cycle which would be introduced by so doing.

Where no fresh liquid is introduced a measured combustible charge is preferably used and the quantity of air which is allowed to enter the compressor at each cycle may also be measured and limited in amount.

For some purposes it is allowable that the compressed air delivered from the apparatus should be mixed with products of combustion, as for instance, when the compressed air is to be used for driving a motor, and when this is the case the pump and the compressor may be interchangeable in respect to their functions, so that combustion occurs in each alternately. Such an arrangement is shown in Fig. 17 where 113 and 114 are the chambers which serve alternately as combustion chambers and air compressor chambers. In the top of chamber 113 are fitted an inlet valve 115 for combustible mixture, an inlet valve 117 for air, and an exhaust valve 119 for the delivery of a mixture of compressed air and burnt products. Corresponding parts 116, 118 and 120 are fitted in the top of chamber 114. Rigidly attached to the top casting of chamber 113 are pivots 121 and 122 about which move two 3-arm cranks 125 and 126. The left and right hand arms are adapted to engage with pins fitted to the stems or valves 115, 117 and 119 as shown in the figure. The top arm of crank 125 is attached by springs 129 and 130 to pawls 131 and 132 respectively, and these pawls are connected by rod 133. The top arm of crank 126 is connected by springs 134 and 135 with pawls 136 and 137 respectively, which are connected by rod 138. Pawl 131 is adapted to engage under a collar 139 on the stem of valve 115. Pawls 132 and 136 are adapted to engage under the collar 140 on the stem of valve 117 and pawl 137 is adapted to engage under the collar 141 on the stem of valve 119. In the outlet pipe there is, in addition to valve 119 a spring-controlled valve 142. Corresponding parts are fitted to the top of chamber 114.

The action of the apparatus is as follows:—The illustrated position of the valves is correct for that part of the cycle in which there is a compressed combustible charge in the top of chamber 113 and a charge of air and burnt products in chamber 114. Ignition now occurs in chamber 113 and the liquid is forced downward and outward from this chamber and rises in chamber 114 expelling the mixed charge at the desired pressure past valves 120 and 143 into the outlet pipe 157. After the liquid has attained the level of the inwardly extending pipe 152 it rises in this pipe and shuts valve 120 by impact. This valve is at once locked by pawl 144 engaging under collar 145 and simultaneously pawl 146 is released from under collar 147, this motion being obtained by the tension on spring 149 which, in the position shown, is greater than the tension on spring 148. The further rise of the liquid in chamber 114 compresses the elastic cushion in the top thereof and stores the energy to give the reverse flow. When the combustible products in chamber 113 have expanded to atmospheric pressure valve 117 is sucked open and air is drawn in to mix with the products of combustion and this motion of the valve moves cranks 125 and 126 through pin 150 engaging with them. When the suction stroke in chamber 113 is finished and the liquid comes to rest, valve 117 closes under the action of its spring and pawls 132 and 136 engage under its collar and pawls 131 and 137 are disengaged from under collars 139 and 141 respectively, this movement being brought about by the fact that in the new position of cranks 125 and 126 the tension of springs 129 and 135 is increased and that of springs 130 and 134 diminished. Valve 119 being now released falls by its own weight, and when the energy stored in the elastic cushion in the top of chamber 114 causes the reverse flow the liquid rising in chamber 113 has a large volume to compress and will not reach the level of the bottom of pipe 151; nothing happens therefore in this chamber except the compression of the mixture therein. But in chamber 114 when the pressure has fallen to atmosphere the further movement draws in a combustible charge past valve 116 and the movement of this valve, causing pin 153 to engage against crank 127, changes the position of this crank and when the valve shuts again under action of its spring pawl 154 engages under collar 155 and locks the valve, while pawl 156 is withdrawn from under collar 147. The liquid having again come to rest and the pressure in chamber 113 being higher than in chamber 114, a second outward flow occurs from chamber 113 and the combustible charge is compressed in chamber 114 and the ignition of this charge starts a fresh cycle in which the functions of the chambers are reversed. Springs, not shown, are used to render stable the extreme positions of cranks 125, 126, 127 and 128 in the manner already referred to for other similar cases. Preferably a measured charge of combustible mixture is used.

Figure 10:
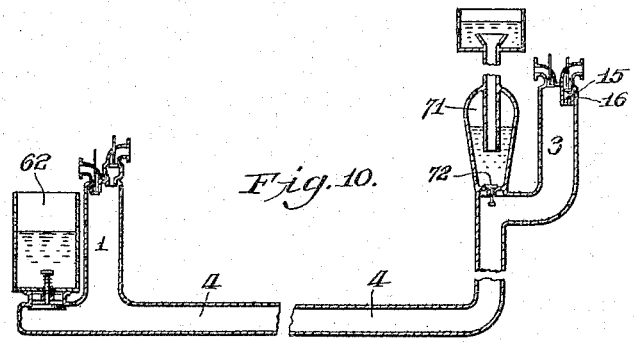
Fig. 10 is a diagrammatic vertical section on a reduced scale showing further modifications.

Mention has been made of an arrangement in which the pump may be simultaneously working to raise water and to compress air, and such an arrangement is shown in Fig. 10 where 1 is a pump, 3 is the air compressor and 71 is an air vessel from which there is a delivery pipe to an elevated reservoir, in this case shown as an open top tank. The pump may be either of the type which has one outward movement of liquid and one inward movement of liquid in pipe 4 per cycle, or the type in which there are two movements of each kind per cycle. If the former, then during the expansion of the ignited combustible mixture liquid is driven along pipe 4 and rises into the air compressor chamber 3, compresses the air therein and delivers some of this air under pressure until the liquid, having risen far enough, valve 16 is shut so that there can be no further delivery of air. The outlet being closed, pressure continues to rise until valve 72, which is an ordinary non-return valve fitted in the bottom of air vessel 71, opens, and the rest of the kinetic energy of the moving liquid is expended in forcing liquid into this air vessel and so causing liquid to be delivered into the elevated tank until the liquid comes to rest, when valve 72 closes. There is then energy left in the elastic cushion of air in the top of chamber 3, which reverses the flow and gives the compression stroke in chamber 1, and when the cushion in chamber 3 has expanded to atmosphere a fresh charge of air is drawn into this chamber. When the liquid again ceases to move there is a fresh combustible charge in the top of chamber 1, the ignition of which starts a fresh cycle. Of course, there is an inflow of liquid at each cycle from the low level tank 62, but there is no necessity to repeat the cycle of operations for the pump as such.

If the pump is of the type in which there are four strokes per cycle, then the action may be regarded the same as that just described until the reverse flow occurs, when the liquid rising in chamber 1 expels products of combustion until it reaches the level of the exhaust valve, which it shuts, and the compression of the elastic cushion follows. As the liquid falls in chamber 3, after the pressure reaches atmosphere, an intake of the air occurs and when the elastic cushion in chamber 1 expands and gives a reverse flow a combustible charge is taken into chamber 1 and the charge of air in chamber 3 is compressed until the liquid again comes to rest; the flow is once more reversed and the fresh combustible charge is compressed in chamber 1 ready for starting a fresh cycle.

Fig. 10 also indicates that the level of the pump portion and the compressor portion need not be the same; indeed, the latter may be either above or below the pump portion. If it is above the pump portion then the height of liquid in the compressor portion assists the elastic cushion in bringing about a reverse flow, while on the other hand, if the compressor portion is below the pump portion the energy stored in the elastic cushion must be greater in order to overcome the difference in level of the liquid in the two chambers.

That the effective mass of liquid that is to have reciprocating movement in the apparatus may be varied by altering the effective length of the pipe which connects the pump portion to the compressor portion, has already been mentioned, and such an arrangement is shown in plan in Fig. 11. 1 and 3 are respectively the pump and the compressor chambers and the valves for liquid are shown at 50 and 51. In pipe 4 are fitted two valves 73 and 74 and in cross connecting pipes are situated valves 75 and 76. If valves 75 and 76 are shut and valves 73 and 74 are open, the whole length of pipe 4 is effective. If valves 73 and 76 are open and valves 74 and 75 are shut it is equivalent to cutting off that portion of the pipe which lies to the right of valve 76. When valves 73 and 76 are shut and valve 75 is open it is equivalent to cutting off that portion of the pipe which lies to the right of valve 75. There may be more cross connections and valves if it is desired to have a greater number of variations of effective length of pipe. Thus, by simply opening and closing valves the effective length of the pipe may be varied in any desired manner.

It has been assumed, in describing the cycles of the various modifications of apparatus, that there already existed a pressure in the outlet pipe at the compressor portion on the discharge side of the outlet valve equal to that at which it was desired to deliver the compressed air. This may, however, not be the case in starting the apparatus, as for instance, when a reservoir for containing the compressed air delivered has to be pumped up to the desired pressure. If the compressor started without pressure in the delivery pipe the irregular working which would otherwise result until the desired pressure had been attained may be avoided by fitting to the outlet pipe the simple device shown in Fig. 12. A movable piston 77 is held in position in a cylinder 78 by two springs 79 and 80 and on the top side of the piston air is maintained at atmospheric pressure by holes 81 which communicate with the atmosphere, while the under side of the piston is subject to the pressure of the air in the delivery pipe 82. The piston is shown in the position which it has when there is atmospheric pressure in the pipe 82, and in this position spring 79 has moved piston 77 into its lowest position and has compressed spring 80 to such an extent that it requires a pressure below the outlet valve 15 equivalent to the desired pressure at which air is to be delivered to open this valve. As the air compressor is set to work and air is discharged past valve 15 the pressure in pipe 82 begins to rise and the pressure on the under side of the piston gradually increases until the desired working pressure for the compressed air is reached when piston 77 has been moved upward against the pressure of spring 79. This upward movement relieves the pressure on spring 80 and the springs may be so adjusted that little or no compression now remains in spring 80. Consequently valve 15 now opens when the pressure below it is substantially equal to the pressure at which the air is to be delivered. By this arrangement the pressure at which valve 15 opens may be maintained practically constant from the starting of the apparatus until the desired pressure of delivery is attained, and thus the pressure conditions for each cycle remain the same, in spite of the varying pressure at the delivery side of the outlet valve.

A device for measuring a combustible charge into the combustion chamber of the pump has already been alluded to, and a further description of it will now be given in connection with Fig. 13.

Figure 14:
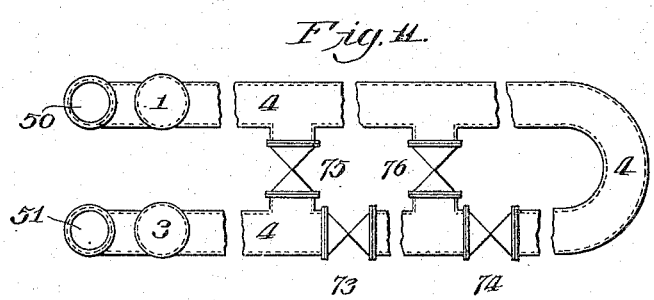
Fig. 14 is a vertical section of a device for controlling the amount of combustible charge admitted at each cycle with relation to the amount of compressed air required.

The combustion chamber 1 is fitted with the usual inlet valve 5, but the stem of this valve has a connection shown diagrammatically as a rod 83 with the stem of valve 84 placed in the combustible inlet pipe, such that when valve 5 opens valve 84 is closed. The combustible inlet pipe 87 is also connected with a measuring chamber 85 in the top of which there is a valve 86 adapted to be shut by impact of liquid upon it. Measuring chamber 85 is connected with a supply of water which is open to the atmosphere in such a manner, for instance, as is shown in Fig. 14 and so that the normal level of water in the measuring chamber may be adjusted.

The action of the apparatus is as follows:—

When valve 5 opens, valve 84 is closed and the suction in chamber 85 causes the liquid to rise therein until valve 86 shuts by the impact of liquid upon it. Thus, valves 84 and 86 being both closed, no more combustible mixture can be taken into chamber 1 and when the pressure in this chamber and in the combustible inlet pipe 87 has risen sufficiently, valve 5 will shut under the action of its spring. This movement of valve 5 opens valve 84, and further combustible mixture flows into pipe 87. Valve 86 falls by its own weight, and the liquid in chamber 85, in falling to its normal level, draws a measured quantity of combustible mixture into the chamber.

The seats of valves 5 and 84 are prolonged in such a manner as to cause these valves to act partly as piston valves, so that valve 84 may be shut by the time valve 5 is open.

It will be seen that by altering the normal level of liquid in chamber 85, the quantity of the measured charge taken in can be varied.

In order to keep the pressure of the compressed air approximately constant it is necessary to make the apparatus deliver more or less air under such pressure to meet the greater or reduced demand for the supply of compressed air. One way of accomplishing this is to cause the amount of measured combustible charge which enters the combustion chamber at each cycle to be increased or diminished according to the amount of compressed air required, and in Fig. 14 a simple arrangement for doing this is shown. Chamber 3 on the right of the figure is the usual air compressor chamber fitted with the usual valves, and at a branch on the compressed air outlet pipe there is fitted a cylinder 88 containing a piston 89 controlled by a spring 90. Attached to the piston is a rod 91 carrying a pin 92 which engages in the slotted end of bell crank 93 and, by means of link 94, bell crank 95, connecting link 96 and arm 97, can rotate valves 98 and 99. Valve 98 is fitted in a water supply pipe 100 and valve 99 is fitted in a run off pipe 101 in such a way that when valve 98 is opened water will be supplied into tank 102 to raise the level of water therein and when valve 99 is open water will be allowed to run from tank 102 so as to lower the level of water therein. Assuming that the pressure of the air in pipe 82 is that at which the compressed air is to be delivered, and which is to be kept approximately constant in spite of varying demands, then piston 89 will be held in equilibrium by the pressure of air above it and by the action of the spring 90 below it, and in this position valves 98 and 99 are both shut so that the normal level of liquid in tank 102 and measuring chamber 85 remains unaltered. Now suppose that owing to an increased demand the pressure in pipe 82 falls, then spring 90 moves the piston 89 upward and by means of the gear shown valve 98 is further shut and valve 99 opened so that water may now escape from tank 102 lowering the level of water therein. The effect of this is that a larger combustible charge is drawn into the measuring chamber and so passed at each cycle into the combustion chamber, and the energy output per cycle is thus increased. More compressed air is consequently delivered at each cycle to meet the increased demand. When the demand for compressed air falls so that the pressure in outlet pipe 82 increases, the action of the parts is reversed and more water enters the tank 102 to raise the level therein, whereby a smaller measured charge passes into the combustion chamber at each cycle, and less work is done.

The effect of more or less liquid in an apparatus such as is illustrated in Figs. 1 to 4, where there is no intake of fresh liquid at each cycle, has already been mentioned, and by reducing this quantity of liquid the amount of combustible charge and the amount of compressed air delivered or either of these may be increased, while with more liquid in the apparatus the reverse may be the case. If the energy derived from each consecutive combustible charge is constant and if the pressure of the air in the outlet pipe of the compressor diminishes, then one effect will be that the maximum cushion pressure in the air compressor chamber will increase, and on the other hand, if the pressure of the compressed air in the outlet pipe increases, the maximum cushion pressure will be decreased. This variation of the cushion pressure arising from the above or any other cause may be applied to give a governing effect on the apparatus by varying the quantity of oscillating liquid so as to keep the cushion pressure approximately constant in spite of varying conditions. One simple form of apparatus suitable for this purpose is shown in Fig. 14, where 103 is an air vessel, high level tank, or other device for storing liquid under pressure, connected with chamber 3 through a pipe 104 which dips to such a level in the chamber that the open end of the pipe is always below the surface of the liquid. A piston valve 105 moves in a cylinder 106 so as to control communication between the air vessel 103 and the pipe 104 giving more or less passage according to its position. One end of the cylinder 106 is open to the chamber 3 so that the pressure in the chamber is communicated to one end of the valve 105 and acting upon the other end of the valve is a spring 107 the thrust of which can be adjusted by a screw. Assuming, in the first place, that valve 105 is fixed in such a position that a throttled communication is established between vessel 103 and chamber 3, liquid flows past valve 105, such flow being determined in direction and amount by the difference of pressure existing between chamber 3 and vessel 103. The pressure or head in vessel 103 may be adjusted so that for a given set of conditions the amount of liquid which passes from chamber 3 to the vessel, during those portions of the cycle when the pressure in chamber 3 is higher than the pressure in the vessel, may equal the amount of liquid which passes in the reverse direction when the pressure in the vessel exceeds the pressure in the chamber. This represents the case of normal working, but if for any reason the time average pressure in chamber 3 increases the result will be that more liquid is forced from chamber 3 into vessel 103 than returns, the air vessel 103 being sufficiently large for the pressure head therein to remain approximately constant. If the time average pressure in chamber 3 falls, the action is reversed. If, therefore, the time average pressure in chamber 3 increases, the amount of active liquid which oscillates between the pump and compressor portions of the apparatus is decreased, thus leaving more space in the top of chamber 3 into which air may be admitted. In consequence of this the time average pressure and the cushion pressure will decrease, it being assumed that the energy developed per cycle remains constant. The action described will continue until sufficient liquid has left chamber 3 to reëstablish approximately the same time average pressure as in normal working, and the desired governing effect is thus obtained. The working of the apparatus may be much improved by allowing valve 105 to move freely under the action of the forces exerted on its two ends. In this case the thrust of spring 107 may be adjusted so as to prevent valve 105 opening until there is a certain pressure in chamber 3, thus eliminating the effect of all pressures in chamber 3 below this amount, and the valve may remain shut if the apparatus ceases to work.

If there is a greater demand for compressed air, so that the pressure in the outlet pipe 82 falls, and if no discharge pressure regulating device, such as is shown in Fig. 12, is fitted, then the amount of energy expended in discharging air from chamber 3 will be less and more energy will remain in the moving liquid when cushioning begins, consequently the maximum cushion pressure will rise. This increase of cushioning pressure will result in more liquid being driven into vessel 103, thus increasing the capacity of chamber 3 for taking in air, which action continues until the amount of compressed air discharged per cycle absorbs sufficient energy to bring back the cushion pressure approximately to the normal. The device is therefore also a safety device, as it tends to prevent the cushion pressure exceeding a given amount.

Another effect of the device is that in increasing the capacity of chamber 3 for taking in air, the stroke of the moving column of liquid is increased, and consequently the volume in the combustion chamber of the pump portion before compression occurs is also increased. If the quantity of combustible mixture admitted is determined by throttling the inlet instead of by using a measuring device such as is described with reference to Fig. 13, the result may be that more combustible mixture is drawn into the apparatus. Consequently the work done per cycle will be increased, and this in turn will result in an effort to bring back the outlet pressure of the compressed air in pipe 82 to its normal amount. Where no measuring device is used for the combustible mixture it is desirable to allow the pressure of the compressed air in the outlet pipe to govern a throttle valve on the combustible inlet, so that, if the pressure of the air rises, less combustible mixture is admitted, and vice versa. This may be accomplished by connecting a part, such as rod 91, with the throttle valve, or like device, so that when piston 89 moves downward the throttle valve is further closed.

The effective volume of the combustion chamber or the compressor chamber, may be varied by fitting a branch 108 (Fig. 15) to such chamber supplied with a movable piston or plug 109. Thus, if the plug is screwed toward the chamber the volume in the top of the chamber is diminished, while, by screwing the plug outwardly from the chamber the volume is increased. The position of the branch may be varied relatively to the lower edge of the exhaust pipe or the lower edge of the air outlet pipe respectively, so that the volume of the branch forms part of the cushioning space or not.

It is well known that pistons of different areas may be used to convert high pressure energy into low pressure energy, or vice versa, and it is obvious that this fact can be utilized in connection with the present invention. Thus, if low pressure air in large volume is required the liquid, instead of rising and falling in an air compressor chamber, may act directly upon a piston 110 (Fig. 16) fitted in a turned portion of the pipe in which the liquid moves. This small piston may be connected with a larger piston 111 and the latter may move in air compressor chamber 112. 14 and 15 are inlet and outlet valves respectively fitted in the chamber and so situated that piston 111 in moving to its top position closes both inlet and outlet and imprisons a cushion of air in the top of the chamber. Similarly, when the piston moves to its bottom position, it closes the vents to the atmosphere 158 and 159 and so cushions the air imprisoned in the bottom of the chamber and prevents the piston striking the chamber. The action of the apparatus is precisely on the same lines as when liquid rises and falls in the chamber, the only difference being that, instead of the liquid rising and shutting valve 16 in chamber 3, to imprison an air cushion which stores the energy for reversing the flow of liquid, piston 111 cuts off communication by covering the inlet and outlet pipes in chamber 112 and thus imprisons an air cushion in the top of this chamber. The air cushion in the bottom of the chamber is not intended normally to come into play as the lowest position to which the piston normally reaches is that shown in Fig. 16.

Throughout the present specification the elastic cushion which is compressed in the air compressor to furnish the energy for the return flow of liquid has been spoken of as a cushion of air, but it has been shown in said co-pending application Serial No. 438,426, that in the case of the pump the elastic cushion may be obtained by a piston or valve in a branch chamber opening into the combustion chamber, that side of the piston which is not presented to the chamber being acted upon by a spring or by compressed air or other equivalent device. It is obvious that a like arrangement may constitute the elastic cushion in the air compressor chamber, in which case the whole or nearly the whole of the compressed air may be delivered from the air vessel at each cycle and the energy stored in the cushioning arrangement just described may be utilized to produce the reverse flow of liquid. In any case where air compressors are made of large size it is desirable to fit elastic cushions of the kind last mentioned merely as auxiliaries for the purpose of safety, so that should the cushioning pressure exceed the maximum desired the auxiliary cushioning device may come into play, the pressure behind the piston of such device being preferably such as to prevent motion of the piston until the maximum cushion pressure in the ordinary air cushion is attained.

For the sake of simplicity the drawings show the combustion chambers and the air compressor chambers as cylindrical vessels, but in actual practice these chambers may vary widely from this form; for instance, the chambers may be narrow at the bottom and top but enlarged toward the center, and the top cylinder cover may be made spherical with advantage. Again, the air compressor chamber has been shown as free from all obstruction to the rising and falling liquid, but vertical ribs may be used to tie the walls together and strengthen them, and such ribs will offer little resistance to the movement of liquid. Sheets of wire gauze can be fixed in the chamber with the object of holding water when wetted as the liquid rises, and this water, being retained in the gauze as the liquid falls, comes in contact with the air during the time the air is in the chamber, and, by presenting a large surface of contact as between the thin films of water held by the gauze and the surrounding air, may very efficiently cool the air.

Figures 18, 19:
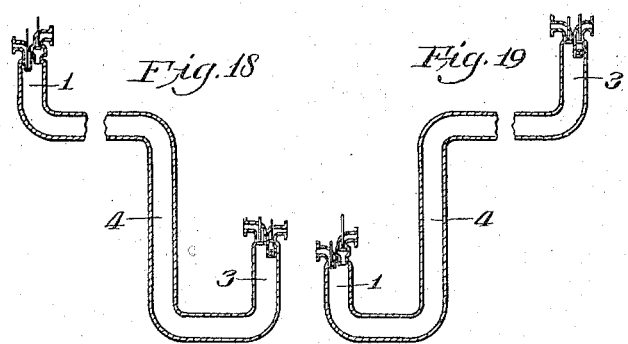
Fig. 18 is a vertical section on a reduced scale of a device showing the pump chamber at an elevation above the compressor chamber.
Fig. 19 is a similar view showing the compressor chamber elevated above the pump chamber.
Figure 20:
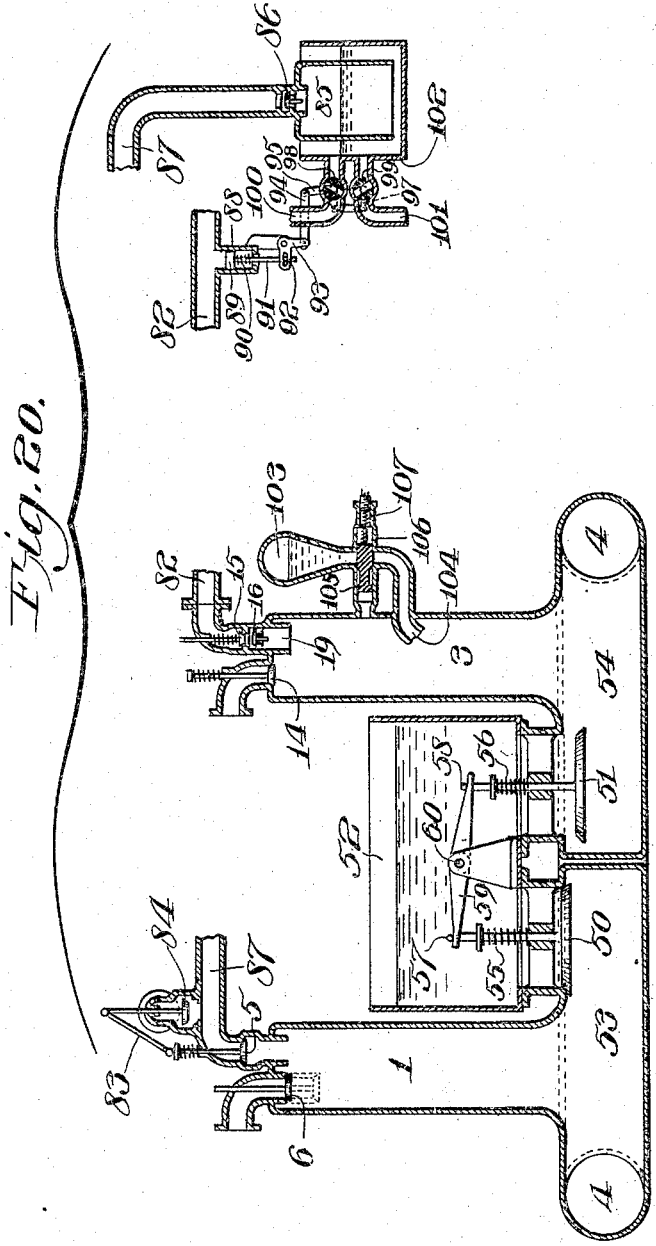
Fig. 20 is a similar view showing the features of Figs. 5, 13 and 14 combined in a single apparatus.

So far, the description of the apparatus has been confined to those cases in which air is taken into the compressor chamber at approximately atmospheric pressure, but the invention is not limited to such cases, as the air may enter the chamber either above or below atmospheric pressure. One simple method of adjusting the apparatus to work under such altered conditions is, to place the pump portion and the compressor portion at different levels. Thus, if the compressor chamber (3) is at a lower level than the pump chamber (1) there will be a head of liquid acting upon the contents of the compressor chamber and maintaining a higher average pressure therein than would otherwise exist, and the converse will be the case if the compressor chamber is elevated above the pump chamber. Figs. 18 and 19 represent these two cases. Taking the cycles as described in connection with Figs. 1 to 4, and applying the cycles to Fig. 18, it is obvious that the only change required is that the pressure of the air which enters the air compressor chamber should be sufficient to balance the hydrostatic pressure due to the difference in level of the liquid in the two chambers. If, on the other hand, it is desired to work with a given pressure of air inlet, then the difference of level between the pump portion and the compressor portion must be adjusted so as to produce a hydrostatic pressure equivalent to this air supply pressure.

In Fig. 19, where the pressure of the air supply is less than that of the atmosphere, the apparatus may be used as an exhauster or as an exhauster and compressor combined.

Where the air is supplied under pressure it may be supplied under such pressure by an apparatus of the kind herein described, which takes in air at atmospheric pressure, and then compression would take place in two stages, and the double apparatus would constitute a two stage compressor.

What I claim is:—

1. Apparatus for forcing fluid comprising a play pipe for the free reciprocation of a liquid column moving with a velocity sufficiently limited to preserve the coherence of the column, and of sufficient bulk and path of travel to acquire useful momentum, means for applying an actuating force to each end of the column at required intervals respectively and means for utilizing the pressure of the liquid column in its reciprocating movements.

2. Apparatus for forcing fluid comprising a play pipe for the free reciprocation of a liquid column moving with a velocity sufficiently limited to preserve the coherence of the column, and of sufficient bulk and path of travel to acquire useful momentum, means for applying an actuating force to each end of the column at required intervals respectively and a discharge in the play pipe as means for utilizing the pressure of the liquid column in its reciprocating movements.

3. Apparatus for forcing fluid comprising a play pipe for the free reciprocation of a liquid column moving with a velocity sufficiently limited to preserve the coherence of the column, and of sufficient bulk and path of travel to acquire useful momentum, said play pipe having fluid inlets at each end and a discharge, and means for applying an actuating force to each end of the liquid column alternately whereby the pressure of the liquid column in its reciprocating movements is utilized.

4. A play pipe for the free reciprocation of a liquid column moving with a velocity sufficiently limited to preserve the coherence of the column, and of sufficient bulk and path of travel to acquire useful momentum, means for applying an actuating force thereto, means whereby the movement of the liquid, due to its momentum, compresses an elastic fluid, and means whereby the energy of a portion of the compressed elastic fluid is utilized to cause a return movement of the liquid to cause an intake of fresh elastic fluid.

5. A play pipe for the free reciprocation of a liquid column moving with a velocity sufficiently limited to preserve the coherence of the column, and of sufficient bulk and path of travel to acquire useful momentum, a power chamber as means for applying an actuating force thereto, means whereby the movement of the liquid due to the actuating force compresses an elastic fluid and means whereby the energy of a portion of the compressed elastic fluid is utilized to cause a return movement of the reciprocating column to exhaust the power chamber and to compress an elastic cushion therein, the energy of said elastic cushion being utilized to cause a second outstroke to introduce a fresh charge and to compress an elastic fluid and the energy of the compressed elastic fluid being utilized to cause a second return stroke of the liquid column to compress the charge.

6. A play pipe for the free reciprocation of liquid, means for applying an actuating force thereto, means whereby the movement of the liquid due to the actuating force compresses an elastic fluid, means whereby the energy of a portion of the compressed elastic fluid is utilized to cause a return movement of the liquid column and means for varying the volume of the elastic fluid compressed by varying the volume of liquid that is forced into the compression space by said actuating force.

7. A play pipe for the free reciprocation of liquid, means for applying an actuating force thereto, means whereby the movement of the liquid due to the actuating force compresses an elastic fluid, and means whereby the energy of a portion of the compressed elastic fluid is utilized to cause a return movement of the liquid and means for varying the volume of air or elastic fluid compressed by allowing liquid to be taken in and rejected during each cycle.

8. A play pipe for the free reciprocation of liquid, means for applying an actuating force thereto, means whereby the movement of the liquid due to the actuating force compresses an elastic fluid, means whereby the energy of a portion of the compressed elastic fluid is utilized to cause a return movement of the liquid column, and means for varying the volume of the elastic fluid compressed by allowing some of the elastic fluid to be taken in and rejected again previous to compression.

9. The combination of a play pipe for the free reciprocation of a column of liquid moving with a velocity sufficiently limited to preserve the coherence of the column, and of sufficient bulk and path of travel to acquire useful momentum, means for applying an actuating force to said column and means whereby the momentum of the moving column is utilized to compress an elastic fluid and deliver a portion thereof.

10. The combination of a play pipe for the free reciprocation of a column of liquid moving with a velocity sufficiently limited to preserve the coherence of the column, and of sufficient bulk and path of travel to acquire useful momentum, means for applying an actuating force to said column, means whereby the momentum of the moving column is utilized to compress an elastic fluid and deliver a portion thereof, and means for utilizing the energy of another portion of said compressed elastic fluid to cause a return movement of the liquid column.

11. The combination of a play pipe for the free reciprocation of a column of liquid moving with a velocity sufficiently limited to preserve the coherence of the column, and of sufficient bulk and path of travel to acquire useful momentum, means for applying an actuating force to said column, means whereby the momentum of the moving column is utilized to compress an elastic fluid and deliver a portion thereof and means for varying the amount of elastic fluid compressed.

12. The combination of a play pipe for the free reciprocation of a column of liquid capable of acquiring useful momentum, means for applying an actuating force to said column, means whereby the momentum of the moving column is utilized to compress an elastic fluid and deliver a portion thereof and means for varying the amount of elastic fluid compressed while the expenditure of initial energy remains constant.

13. The combination of a play pipe for the free reciprocation of a column of liquid moving with a velocity sufficiently limited to preserve the coherence of the column, and of sufficient bulk and path of travel to acquire useful momentum, means for applying an actuating force to said column, means whereby the momentum of the moving column is utilized to compress an elastic fluid and deliver a portion thereof and means for varying the pressure of compression of said elastic fluid.

14. The combination of a play pipe for the free reciprocation of a column of liquid moving with a velocity sufficiently limited to preserve the coherence of the column, and of sufficient bulk and path of travel to acquire useful momentum, means for applying an actuating force to said column, means whereby the momentum of the moving column is utilized to compress an elastic fluid and deliver a portion thereof and means for measuring or controlling the actuating force.

15. The combination of a play pipe for the free reciprocation of a liquid column moving with a velocity sufficiently limited to preserve the coherence of the column, and of sufficient bulk and path of travel to acquire useful momentum, means for applying to said column an actuating force derived from an expansible medium, means for utilizing the momentum of the moving column to compress an elastic fluid and deliver a portion thereof, and means for limiting the action of the expansible medium for the purpose of creating a partial vacuum at the rear of the outstroke, whereby a fresh expansible charge is introduced facilitating the return stroke.

16. The combination of a play pipe for the free reciprocation of a liquid column, means for applying an actuating force thereto to cause an outstroke, means for utilizing the momentum of the outstroke to compress an elastic fluid and to deliver a portion thereof, means for utilizing the energy of the remaining compressed fluid to cause a return stroke of the liquid and regulatable means for introducing and discharging liquid for controlling the volume of compressed elastic fluid discharged.

17. The combination of a play pipe for the free reciprocation of a liquid column, means for applying an actuating force thereto to cause an outstroke, means for utilizing the momentum of the outstroke to compress an elastic fluid and to deliver a portion thereof, means for utilizing the energy of the remaining compressed fluid to cause a return stroke of the liquid, and regulatable means for introducing and discharging liquid for controlling the pressure of compressed elastic fluid.

18. The combination of a play pipe for the free reciprocation of a liquid column, means for applying an actuating force thereto to cause an outstroke, means for utilizing the momentum of the outstroke to compress an elastic fluid and to deliver a portion thereof, means for utilizing the energy of the remaining compressed fluid to cause a return stroke of the liquid, and regulatable means for introducing and permitting to escape fresh elastic fluid for controlling the pressure or volume of the fluid compressed.

19. The combination of a play pipe for the free reciprocation of a liquid column moving with a velocity sufficiently limited to preserve the coherence of the column, and of sufficient bulk and path of travel to acquire useful momentum, means for applying an actuating force to the liquid, means for utilizing the momentum of the liquid to compress an elastic fluid comprising two chambers connected with the play pipe adapted to act alternately as expansion and compression chambers.

20. The combination of a play pipe for the reciprocation of a liquid column moving with a velocity sufficiently limited to preserve the coherence of the column, and of sufficient bulk and path of travel to acquire useful momentum, an expansion chamber connected therewith, a compression chamber also connected to and in constant communication with the play pipe at a point removed from the expansion chamber, and means for securing the introduction into the expansion chamber at each cycle of a definite measured expansible charge.

21. The combination of a play pipe for the free reciprocation of a column of liquid, capable of acquiring useful momentum, means for applying an actuating force thereto, means for utilizing the momentum of the liquid to compress and discharge elastic fluid, and means for maintaining a constant pressure at the discharge.

22. The combination of a play pipe for the free reciprocation of a column of liquid capable of acquiring useful momentum, means for applying an actuating force thereto, means for utilizing the momentum of the liquid to compress and discharge elastic fluid and means for automatically maintaining a constant pressure at the discharge.

23. The combination of a play pipe for the free reciprocation of a column of liquid, moving with a velocity sufficiently limited to preserve the coherence of the column, and of sufficient bulk and path of travel to acquire useful momentum, means for applying an actuating force thereto comprising an expansion chamber provided with an expansible charge, means for utilizing the momentum of said movement to compress an elastic fluid and discharge part thereof, means for utilizing the energy of the remaining compressed elastic fluid to cause a return stroke of the liquid to entrain fresh elastic fluid and to compress a fresh expansible charge.

24. The combination of a play pipe for the free reciprocation of a column of liquid moving with a velocity sufficiently limited to preserve the coherence of the column, and of sufficient bulk and path of travel to acquire useful momentum, means for applying an actuating force thereto comprising an expansion chamber provided with a combustible charge, means for utilizing the momentum of said movement to compress an elastic fluid and discharge part thereof, means for utilizing the energy of the remaining compressed elastic fluid to cause a return stroke of the liquid to entrain fresh elastic fluid and to compress a fresh combustible charge.

25. The combination of a play pipe for the reciprocation of a liquid column moving with a velocity sufficiently limited to preserve the coherence of the column, and of sufficient bulk and path of travel to acquire useful momentum, a power chamber and a compressor chamber connected therewith, and a liquid discharge connected with the play pipe.

26. The combination of a play pipe for the reciprocation of a liquid column moving with a velocity sufficiently limited to preserve the coherence of the column, and of sufficient bulk and path of travel to acquire useful momentum, a power chamber and a compressor chamber connected therewith, a liquid discharge connected with the play pipe, and a liquid intake at the end of the play pipe.

27. The combination of a play pipe for the reciprocation of a liquid column moving with a velocity sufficiently limited to preserve the coherence of the column, and of sufficient bulk and path of travel to acquire useful momentum, a power chamber and a compressor chamber connected therewith, a liquid discharge connected with the play pipe, and an air vessel connected with the liquid discharge.

28. The combination of a play pipe for the free reciprocation of liquid capable of acquiring useful momentum, means for applying an actuating force to said liquid, means for utilizing the momentum of the liquid to compress an elastic medium and deliver a portion thereof, and automatic means for maintaining a constant and predetermined pressure at the discharge.

29. The combination of a play pipe for liquid, an expansion chamber connected therewith, a compression chamber also connected to the play pipe at a point removed from the expansion chamber, means for securing the introduction into the expansion chamber at each cycle of a definite measured expansible charge comprising a measuring chamber containing water and means for adjusting the normal level of the water.

30. The combination of a play pipe for liquid, an expansion chamber connected therewith, a compression chamber also connected to the play pipe at a point removed from the expansion chamber, means for securing the introduction into the expansion chamber at each cycle of a definite measured expansible charge comprising a measuring chamber containing water and means for automatically adjusting the normal level of the water to meet the requirements of air pressure supply.

31. The combination of a play pipe for liquid, an expansion chamber connected therewith, a compression chamber also connected to the play pipe at a point removed from the expansion chamber, means for securing the introduction into the expansion chamber at each cycle of a definite measured expansible charge comprising a measuring chamber containing water and means for automatically adjusting the normal level of the water controlled by the pressure of the air pressure discharge.

32. The combination of a play pipe for the free reciprocation of a liquid column capable of acquiring useful momentum, a combustion chamber connected therewith, a compression chamber also connected with the play pipe and means for varying the quantity of oscillating liquid so as to keep the cushion pressure approximately constant in spite of varying conditions.

33. The combination of a play pipe for the free reciprocation of a liquid column capable of acquiring useful momentum, a combustion chamber connected therewith, a compression chamber also connected with the play pipe and means for varying the intake of a combustible mixture by varying the quantity of oscillating liquid in the play pipe, said means controlled by the pressure of the air pressure discharge.

34. The combination of a play pipe for the free reciprocation of liquid capable of acquiring useful momentum, means for applying an actuating force thereto comprising an expansion chamber, means for utilizing the momentum of the liquid to compress an expansible medium and means for varying the effective volume of the expansion chamber.

HERBERT ALFRED HUMPHREY.

Witnesses:
OLIVER Y. IMAY,
WALTER J. SKERTEN.